United States Patent
Shi et al.

(10) Patent No.: US 12,145,262 B2
(45) Date of Patent: Nov. 19, 2024

(54) POWER-ASSISTED NEGATIVE PRESSURE TYPE FLEXIBLE EXOSKELETON SYSTEM USED FOR EXTRAVEHICULAR SPACESUIT

(71) Applicant: Xi'an Jiaotong University, Xi'an (CN)

(72) Inventors: Hu Shi, Xi'an (CN); Kun Tan, Xi'an (CN); Xuesong Mei, Xi'an (CN); Tao Geng, Xi'an (CN); Wenqiao Liu, Xi'an (CN)

(73) Assignee: Xi'an Jiaotong University, Xi'an (CN)

( * ) Notice: Subject to any disclaimer, the term of this patent is extended or adjusted under 35 U.S.C. 154(b) by 287 days.

(21) Appl. No.: 17/837,159

(22) Filed: Jun. 10, 2022

(65) Prior Publication Data
US 2023/0069675 A1    Mar. 2, 2023

(30) Foreign Application Priority Data
Aug. 27, 2021    (CN) .......................... 202110998655.2

(51) Int. Cl.
*B25J 9/00*    (2006.01)
*B64G 6/00*    (2006.01)

(52) U.S. Cl.
CPC .............. *B25J 9/0006* (2013.01); *B64G 6/00* (2013.01)

(58) Field of Classification Search
CPC ........ B25J 9/0006; B25J 13/088; B25J 9/142; B64G 6/00; Y02P 90/02
See application file for complete search history.

(56) References Cited

U.S. PATENT DOCUMENTS

| 2013/0040783 A1* | 2/2013 | Duda ................... A63B 21/225 482/9 |
| 2016/0114482 A1* | 4/2016 | Lessing ................... B25J 15/12 294/196 |
| 2019/0056248 A1* | 2/2019 | Shepherd ............... B25J 13/081 |

FOREIGN PATENT DOCUMENTS

| WO | WO-2020117963 A1 * | 6/2020 | ........... A61H 1/0281 |
| WO | WO-2020257925 A1 * | 12/2020 | ........... A41D 13/018 |

\* cited by examiner

*Primary Examiner* — Stephen Holwerda
(74) *Attorney, Agent, or Firm* — The Dobrusin Law Firm, P.C.

(57) ABSTRACT

A power-assisted negative pressure type flexible exoskeleton system used for an extravehicular spacesuit. The system includes an exoskeleton pneumatic control system, a plurality of inertial sensors, a plurality of negative pressure type flexible actuators and a plurality of flexible bending sensors, wherein pneumatic energy is provided for the exoskeleton system by a gas source in the exoskeleton control system, compressed air is cleaned by a water-separating gas filter, normal work of a pneumatic actuating element is guaranteed, a pressure reducing valve and a pressure gauge carry out voltage stability control on the output pressure of the gas source, a two-position two-way valve serves as a gas source switch valve, and three-position three-way valves, proportional pressure valves and the flexible actuators form four pneumatic control loops of the left and right elbow joints and the left and right knee joints of the exoskeleton system.

8 Claims, 4 Drawing Sheets

POWER-ASSISTED NEGATIVE PRESSURE TYPE FLEXIBLE EXOSKELETON SYSTEM USED FOR EXTRAVEHICULAR SPACESUIT

CROSS REFERENCE TO RELATED APPLICATION

This patent application claims the benefit and priority of Chinese Patent Application No. 202110998655.2, filed on Aug. 27, 2021, the disclosure of which is incorporated by reference herein in its entirety as part of the present application.

TECHNICAL FIELD

The present disclosure belongs to the technical field of robots, and relates to a power-assisted negative pressure type flexible exoskeleton system used for an extravehicular spacesuit.

BACKGROUND ART

In recent years, the exoskeleton robot technology is continuously developed and matured, and the purpose of enhancing and expanding the human motion capacity is achieved, so that the exoskeleton technology has important application prospects in multiple fields of medical treatment, military affairs, transportation and the like. The extravehicular spacesuit is important equipment for guaranteeing the extravehicular safety of an astronaut. However, due to the effect of excess pressure (the difference between the internal pressure and the external pressure of the spacesuit is about 40 kPa) caused by vacuum protection of the spacesuit, the spacesuit inevitably generates considerable joint resistance when the astronaut move. Therefore, the exoskeleton robot technology is combined with the extravehicular spacesuit, and the exoskeleton technology has extremely high practical application significance and academic research values for joint motion assistance of the astronaut wearing the extravehicular spacesuit for operation.

At present, the research on power-assisted exoskeleton for an extravehicular spacesuit is mainly based on a traditional rigid exoskeleton. A rigid parallel mechanism matched with the freedom degree of the spacesuit is designed outside the spacesuit. Spacesuit joint assistance is carried out through driving motors at joints. However, the rigid exoskeleton structure is usually large in mass and inertia, so that the state of the wearer in the motion process is affected. Moreover, the rigid exoskeleton joint is not matched with the actual joint freedom degree of the spacesuit, and the joint motion center is not aligned. Therefore, the exoskeleton generates certain mechanical counterforce to the spacesuit in the motion process, and the motion capacity of the spacesuit is limited. In addition, because the rigid exoskeleton is installed outside the extravehicular spacesuit, the exoskeleton system is directly exposed in the severe environment of the space when the astronaut performs extravehicular operation, and great challenges are caused to the safety and the maintainability of the exoskeleton system.

SUMMARY

In order to overcome the shortcomings in the prior art, the present disclosure aims to provide a power-assisted negative pressure type flexible exoskeleton system used for an extravehicular spacesuit.

In order to achieve the above purpose, the present disclosure adopts the following technical scheme:

The present disclosure is a power-assisted negative pressure type flexible exoskeleton system used for an extravehicular spacesuit, comprising an exoskeleton pneumatic control system, a plurality of inertial sensors, a plurality of negative pressure type flexible actuators and a plurality of flexible bending sensors;

the inertial sensors are respectively installed on the left and right big arms, the left and right forearms, the left and right thighs and the left and right shanks of a human body and used for detecting motion signals of elbow joints and knee joints of the human body;

the negative pressure type flexible actuators are respectively fixed at two joints of elbows and knees in the spacesuit;

the flexible bending sensors are respectively fixed at the bottoms of a plurality of negative pressure type flexible actuators and used for monitoring the bending state signals of the flexible actuators in real time; and the exoskeleton pneumatic control system is integrated in a knapsack of the extravehicular spacesuit, wherein a controller of the exoskeleton control system is respectively connected with the inertial sensors and the flexible bending sensors.

Preferably, the exoskeleton pneumatic control system comprises a controller, a gas source, a water-separating gas filter, a pressure reducing valve, a pressure gauge, a two-position two-way valve, a plurality of three-position three-way valves and a plurality of proportional pressure valves; the gas source, the water-separating gas filter, the pressure reducing valve, the pressure gauge and the two-position two-way valve are sequentially connected to form a stable air pressure output source; a first three-position three-way valve is connected with a first proportional pressure valve to form a first branch, a second three-position three-way valve is connected with a second proportional pressure valve to form a second branch, a third three-position three-way valve is connected with a third proportional pressure valve to form a third branch, a fourth three-position three-way valve is connected with a fourth proportional pressure valve to form a fourth branch, and the two-position two-way valve is respectively connected with the four branches.

Preferably, the negative pressure type flexible actuator is provided with a locking hoop, an end cover and a pneumatic quick-plug connector. The end cover is connected with the negative pressure type flexible actuator through the locking hoop, and the pneumatic quick-plug connector is arranged on the end cover.

Preferably, a vent hole is formed in the left side of the negative pressure type flexible actuator, the vent hole can be embedded into the negative pressure type flexible actuator through a hole end cover, and the vent hole and the negative pressure type flexible actuator are connected in a sealed and locked mode through the locking hoop.

Preferably, the four branches of the exoskeleton pneumatic control system are respectively connected with a first negative pressure type flexible actuator, a second negative pressure type flexible actuator, a third negative pressure type flexible actuator and a fourth negative pressure type flexible actuator which are fixed at the joints of the spacesuit to form four air pressure control loops of the left and right elbow joints and the left and right knee joints of the exoskeleton system.

Preferably, the first three-position three-way valve, the second three-position three-way valve, the third three-position three-way valve and the fourth three-position three-way valve respectively control switching of three states of inflation, maintaining and deflation of the four air pressure control loops; and the first proportional pressure valve, the second proportional pressure valve, the third proportional pressure valve and the fourth proportional pressure valve respectively control the flow and the pressure input into the first negative pressure type flexible actuator, the second negative pressure type flexible actuator, the third negative pressure type flexible actuator and the fourth negative pressure type flexible actuator.

Preferably, the negative pressure type flexible actuator is made of an elastic rubber material through a mold and is of a corrugated structure in shape.

Preferably, the pneumatic quick-plug connector is in threaded connection with the end cover.

Preferably, the flexible bending sensor is integrated at the bottom end of the negative pressure type flexible actuator and is bonded through a sealant. Compared with the prior art, the present disclosure has the following beneficial effects.

The power-assisted negative pressure type flexible exoskeleton system used for an extravehicular spacesuit in the present disclosure is power-assisted equipment for joints for assisting an astronaut to perform extravehicular operation by using the negative pressure type flexible actuators. The inertial sensors are installed on the left and right big arms, the left and right forearms, the left and right thighs and the left and right shanks of a human body and used for detecting motion signals of elbow joints and knee joints of the human body. The motion signals at the joints of the astronaut are collected by using the small-sized inertial sensors so as to control and adjust the flexible actuators. The flexible bending sensor is fixed at the bottom of the negative pressure type flexible sensor and used for monitoring the bending state signals of the flexible sensor in real time. The flexible bending sensor performs feedback control of the system by collecting the bending angle signals of the flexible actuator, so that the control precision of the system is improved. The exoskeleton pneumatic control system is integrated and installed in the knapsack of the extravehicular spacesuit and used for isolating the exoskeleton pneumatic control system from the severe environment of the space, and the safety and the maintainability of the system are high. The exoskeleton pneumatic control system controller is connected with the inertial sensor and the flexible bending sensor and can perform centralized collection and processing of sensing signals. The negative pressure type flexible actuators are arranged at the elbow and knee joints with particularly obvious joint resistance characteristics in the extravehicular spacesuit, and the power-assisted negative pressure type flexible exoskeleton system used for an extravehicular spacesuit is converted into a flexible internal system from a traditional rigid external system of the spacesuit. Then, the power-assisted negative pressure type flexible exoskeleton system used for an extravehicular spacesuit adopts a negative pressure type working mode. The extravehicular spacesuit has an internal and external pressure difference effect of about 40 kPa due to vacuum protection. The internal space of the negative pressure type flexible actuator communicates with the external space of the extravehicular spacesuit. The negative pressure type flexible actuator works in a 40 kPa negative pressure environment. Compared with traditional negative pressure flexible driving equipment, exoskeleton power-assisted driving is carried out only by controlling communication or closing of the flexible actuator and the external environment of the spacesuit through air pressure valves, and a special air pump is not needed to control the negative pressure environment. Therefore, the exoskeleton system can well adapt to the working environment of the extravehicular spacesuit through a negative pressure working mode. Thus, the exoskeleton system for an extravehicular spacesuit in the present disclosure takes the negative pressure type flexible actuator as a core, and is soft in structure, small in joint inertia, simple and reliable in control process and capable of effectively providing comfortable joint motion assistance for extravehicular operation of astronauts.

Further, the gas source, the water-separating gas filter, the pressure reducing valve, the pressure gauge and the two-position two-way valve form a stable air pressure output source, and pneumatic energy is provided for the exoskeleton system by the gas source; compressed air is cleaned by the water-separating gas filter, so that normal work of a pneumatic actuating element is guaranteed; the pressure reducing valve and the pressure gauge carry out voltage stability control on the output pressure of the gas source; and as a gas source switching valve, the two-position two-way valve controls the switching state of a pneumatic loop of the whole exoskeleton system.

Further, a vent hole is formed in the left side of the negative pressure type flexible actuator, the vent hole can be embedded into the negative pressure type flexible actuator through a hole end cover, and the vent hole and the negative pressure type flexible actuator are connected in a sealed and locked mode through the locking hoop, so that the pneumatic control system can be simply and quickly connected.

Further, the three-position three-way valves, the proportional pressure valves and the flexible actuators fixed to the joints of the spacesuit form four air pressure control loops of the left and right elbow joints and the left and right knee joints of the exoskeleton system, and the three-position three-way valves control the three states of inflation, maintaining and deflation of the exoskeleton pneumatic loop. Compared with traditional negative pressure flexible driving equipment, exoskeleton power-assisted driving is carried out only by controlling communication or closing of the flexible actuators and the external environment of the spacesuit through air pressure valves, and a special air pump is not needed to control the negative pressure environment.

Further, the flexible actuator is made of rubber and other elastic materials, is easy to adapt to different motion states of a wearer, meets the requirement for wearing between the human body and clothes in the extravehicular spacesuit, and is of a corrugated structure in shape to meet the activity characteristics of elbow and knee joints without resistance. Therefore, the exoskeleton system is converted into a flexible internal system from a traditional rigid external system of the spacesuit.

Further, the pneumatic quick-plug connector is in threaded connection with the end cover. The structure is simple, the connection is reliable, and the assembly and disassembly are convenient, so that quick-plug connection of pneumatic pipelines is facilitated.

Further, the flexible bending sensor is integrated at the bottom end of the negative pressure type flexible actuator and is bonded through a sealant. The negative pressure type flexible actuator is closely attached, so that the bending signals of the negative pressure type flexible actuator can be fully and accurately collected.

Reference signs: 1, gas source; 2, water-separating gas filter; 3, pressure reducing valve; 4, pressure gauge; 5, two-position two-way valve; 6.1, first three-position three-way valve; 6.2, second three-position three-way valve; 6.3, third three-position three-way valve; 6.4, fourth three-position three-way valve; 7.1, first proportional pressure valve; 7.2, second proportional pressure valve; 7.3, third proportional pressure valve; 7.4, fourth proportional pressure valve; 8.1 first negative pressure type flexible actuator; 8.2, second negative pressure type flexible actuator; 8.3, third negative pressure type flexible actuator; 8.4, fourth negative pressure type flexible actuator; 9, flexible bending sensor; 10, locking hoop; 11, end cover; 12, pneumatic quick-plug connector; 13.1, inertial sensor I; 13.2, inertial sensor II; 13.3, inertial sensor III; 13.4, inertial sensor IV; 13.5, inertial sensor V; 13.6, inertial sensor VI; 13.7, inertial sensor VII; and 13.8, inertial sensor VIII.

DETAILED DESCRIPTION OF THE EMBODIMENTS

To make a person skilled in the art understand the technical solutions in the present disclosure better, the following clearly and completely describes the technical solutions in the embodiments of the present disclosure with reference to the attached figures in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

It needs to be noted that in the specification, claims, and attached figures of the present disclosure, the terms such as "first" and "second" are intended to distinguish between similar objects but do not necessarily indicate a specific order or sequence. It should be understood that the data termed in such a way are interchangeable in proper circumstances, so that this embodiment of the present disclosure described herein can be implemented in other orders than the order illustrated or described herein. In addition, the terms "comprise", "have", and any other variant thereof are intended to cover a non-exclusive inclusion. For example, a process, method, system, product, or device that comprises a list of steps or units is not necessarily limited to those steps or units that are expressly listed, but may comprise other steps or units that are not expressly listed or are inherent to the process, method, system, product, or device.

The present disclosure is further described in details below in combination with the attached figures.

Figure 1:
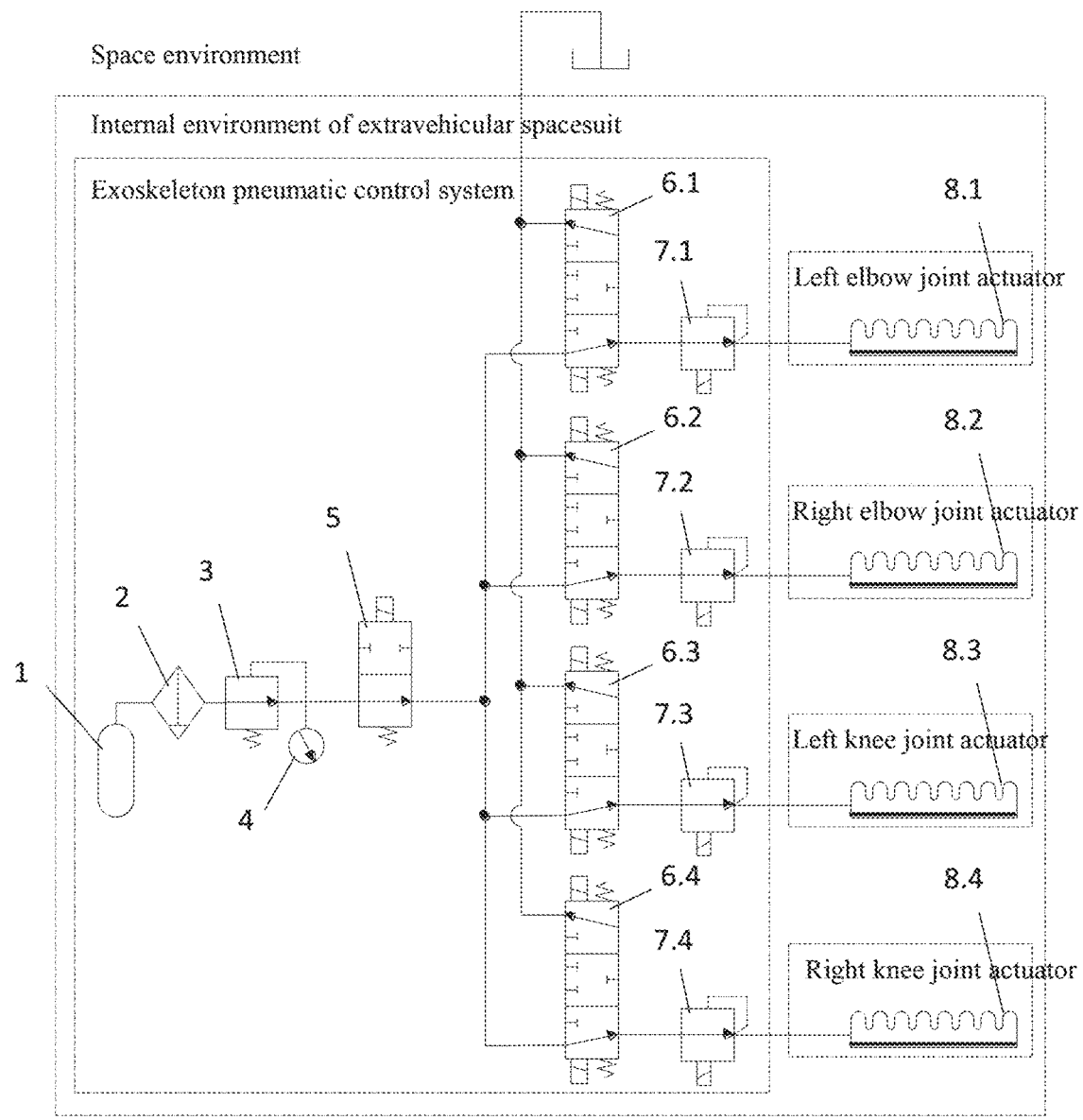
FIG. 1 is a layout diagram of an exoskeleton control system for an extravehicular spacesuit in the present disclosure.

FIG. 1 is a layout diagram of an exoskeleton control system for an extravehicular spacesuit in the present disclosure. The exoskeleton control system comprises an exoskeleton pneumatic control system and a plurality of negative pressure type flexible sensors, wherein the exoskeleton pneumatic control system comprises a gas source 1, a water-separating gas filter 2, a pressure reducing valve 3, a pressure gauge 4, a two-position two-way valve 5, four three-position three-way valve and four proportional pressure valves. The gas source 1, the water-separating gas filter 2, the pressure reducing valve 3, the pressure gauge 4 and the two-position two-way valve 5 are sequentially connected to form a stable air pressure output source; and a first three-position three-way valve 6.1 is connected with a first proportional pressure valve 7.1 to form a first branch, a second three-position three-way valve 6.2 is connected with a second proportional pressure valve 7.2 to form a second branch, a third three-position three-way valve 6.3 is connected with a third proportional pressure valve 7.3 to form a third branch, a fourth three-position three-way valve 6.4 is connected with a fourth proportional pressure valve 7.4 to form a fourth branch, and the two-position two-way valve 5 is respectively connected with the four branches. The four branches of the exoskeleton pneumatic control system are respectively connected with a first negative pressure type flexible actuator 8.1, a second negative pressure type flexible actuator 8.2, a third negative pressure type flexible actuator 8.3 and a fourth negative pressure type flexible actuator 8.4 which are fixed at the joints of the spacesuit to form four air pressure control loops of the left and right elbow joints and the left and right knee joints of the exoskeleton system. Pneumatic energy is provided for the exoskeleton system by the gas source 1. Compressed air is cleaned by the water-separating gas filter 2, so that normal work of a pneumatic actuating element is guaranteed. The pressure reducing valve 3 and the pressure gauge 4 carry out voltage stability control on the output pressure of the gas source. As a gas source switching valve, the two-position two-way valve 5 controls the switching state of a pneumatic loop of the whole exoskeleton system. The first three-position three-way valve 6.1, the second three-position three-way valve 6.2, the third three-position three-way valve 6.3 and the fourth three-position three-way valve 6.4 respectively control switching of three states of inflation, maintaining and deflation of the four air pressure control loops; and the first proportional pressure valve 7.1, the second proportional pressure valve 7.2, the third proportional pressure valve 7.3 and the fourth proportional pressure valve 7.4 respectively control the flow and the pressure input into the first negative pressure type flexible actuator 8.1, the second negative pressure type flexible actuator 8.2, the third negative pressure type flexible actuator 8.3 and the fourth negative pressure type flexible actuator 8.4.

Figure 2:
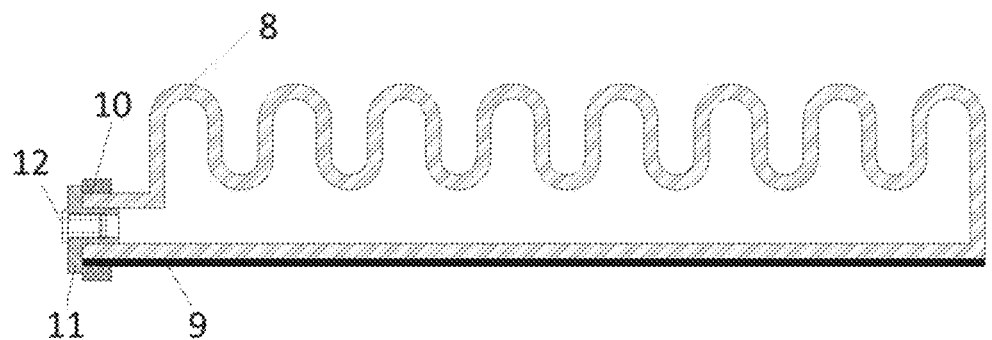
FIG. 2 is a structural assembly diagram of a negative pressure type flexible actuator in the present disclosure.

FIG. 2 is a structural assembly diagram of a negative pressure type flexible actuator in the present disclosure. The negative pressure type flexible actuator 8 is made of an elastic rubber material through a mold and is of a corrugated structure in shape, and the structure can generate large bending deformation. A negative pressure type flexible bending sensor 9 is bonded to the bottom of the negative pressure type flexible sensor 8 through a sealant and used for monitoring bending state signals of the negative pressure type flexible sensor in real time. A vent hole is formed in the left side of the negative pressure type flexible actuator 8, the vent hole can be embedded into the negative pressure type flexible actuator 8 through a hole end cover 11, and the vent hole and the negative pressure type flexible actuator 8 are connected in a sealed and locked mode through the locking hoop 10. The pneumatic quick-plug connector 12 is in threaded connection with the end cover 11 so as to facilitate quick-plug connection of pneumatic pipelines.

Figure 3:
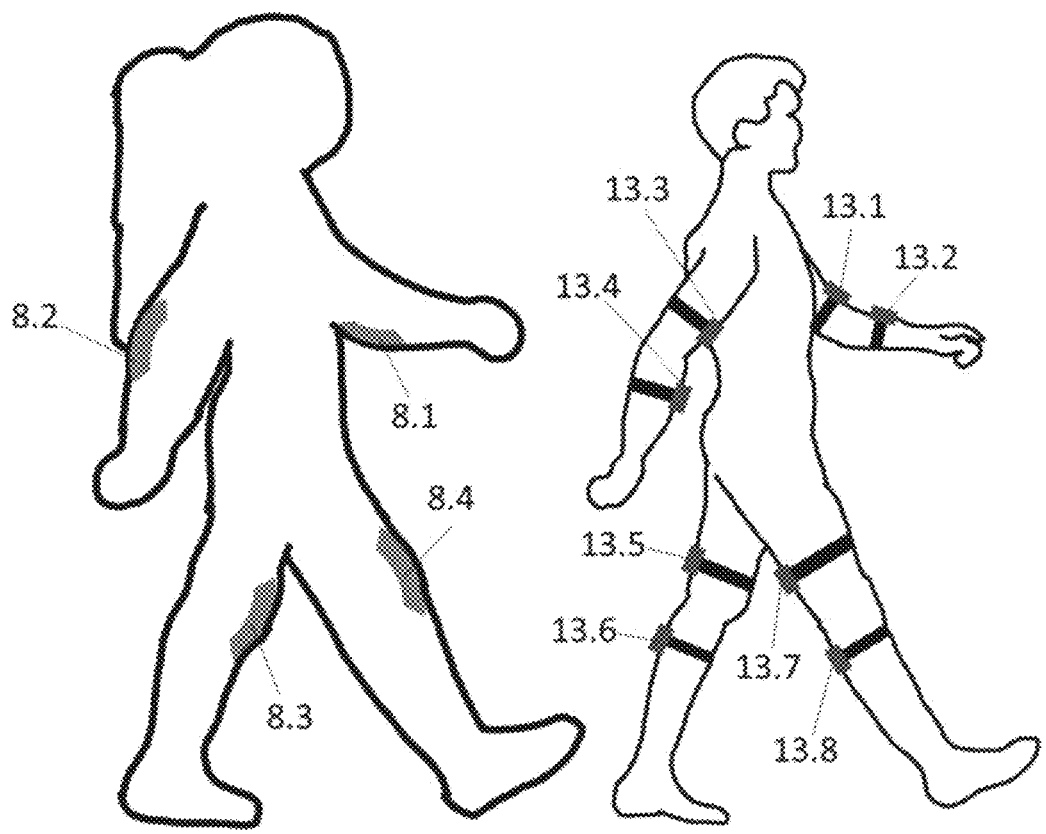
FIG. 3 is a layout diagram of sensors and actuators in the present disclosure.

FIG. 3 is a layout diagram of sensors and actuators in the present disclosure. The power-assisted exoskeleton system for an extravehicular spacesuit in the present disclosure works in the internal environment of the extravehicular spacesuit. The exoskeleton pneumatic control system is integrated and installed in a knapsack of the extravehicular spacesuit. The first negative pressure type flexible actuator 8.1, the second negative pressure type flexible actuator 8.2, the third negative pressure type flexible actuator 8.3 and the fourth negative pressure type flexible actuator 8.4 are respectively arranged on the left and right elbow joints and the left and right knee joints of the spacesuit through magic tapes. An inertial sensor I 13.1, an inertial sensor II 13.2, an inertial sensor III 13.3, an inertial sensor IV 13.4, an inertial sensor V 13.5, an inertial sensor VI 13.6, an inertial sensor VII 13.7 and an inertial sensor VIII 13.8 are respectively arranged at the left and right big arms, the left and right forearms, the left and right thighs and the left and right shanks of a human body through bandages.

Figure 4:
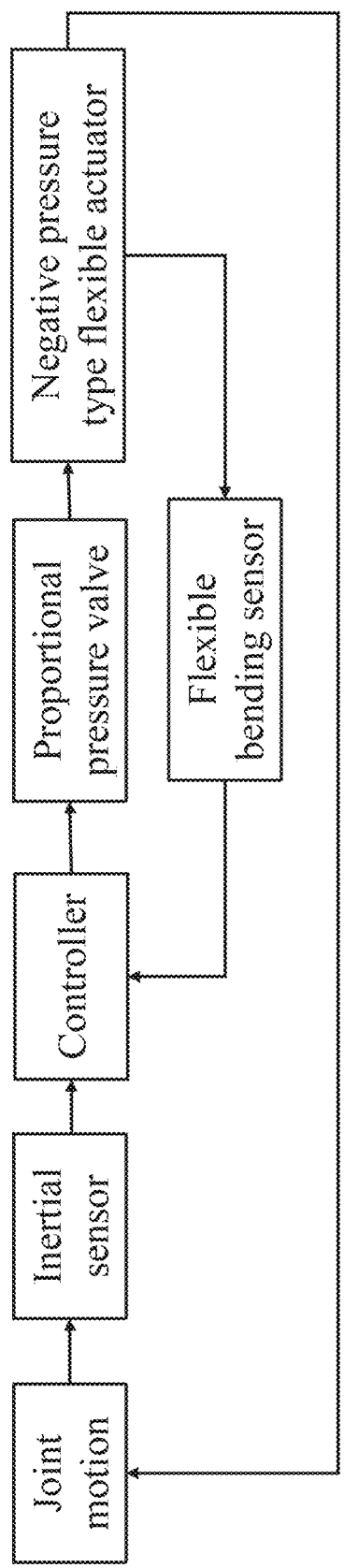
FIG. 4 is a frame diagram of an exoskeleton control scheme for an extravehicular spacesuit in the present disclosure.

FIG. 4 is a frame diagram of an exoskeleton control scheme for an extravehicular spacesuit in the present disclosure. Through the exoskeleton control scheme for the extravehicular spacesuit, when astronaut joints move, the inertial sensor collects the motion information of the astronaut joints and transmits the motion information to the controller of the exoskeleton pneumatic control system, and the controller of the exoskeleton pneumatic control system controls the negative pressure type flexible actuator by adjusting the proportional pressure valve; and bending information of the negative pressure type flexible actuator is collected by the flexible bending sensor 9 fixed to the bottom of the negative pressure type flexible actuator and fed back to the exoskeleton pneumatic control system.

Figure 5:
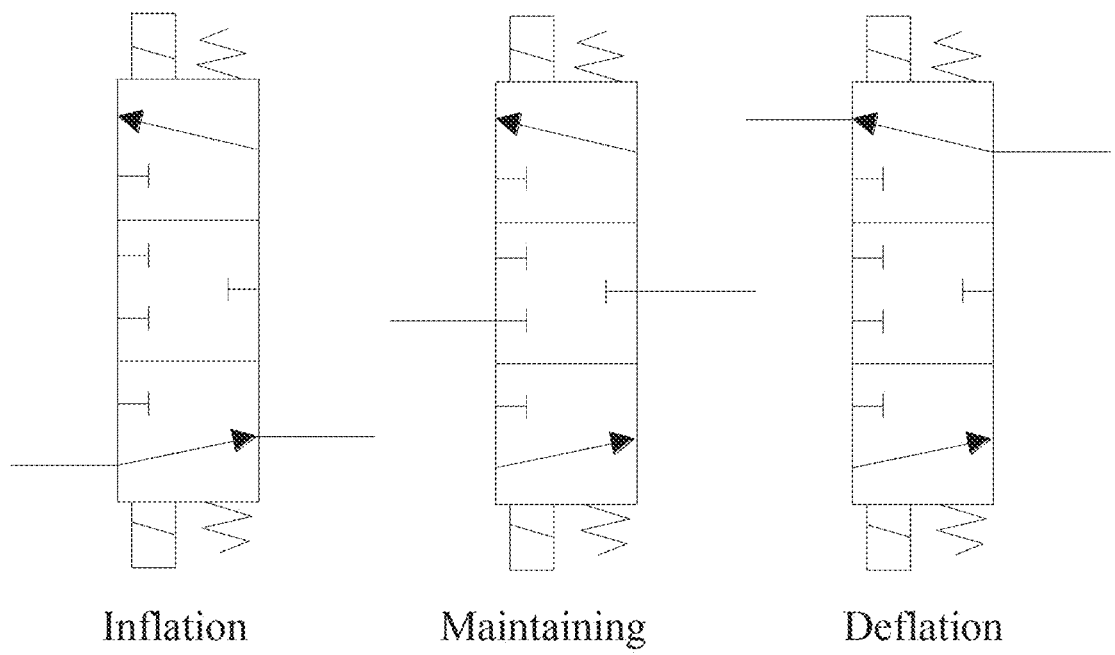
FIG. 5 is a control diagram of an exoskeleton working condition of an extravehicular spacesuit in the present disclosure.

FIG. 5 is a control diagram of an exoskeleton working condition of an extravehicular spacesuit in the present disclosure. The exoskeleton system for an extravehicular spacesuit is controlled through inflation, maintaining and deflation of the three-position three-way valve. The working process is as follows.

The whole exoskeleton system is installed in the internal environment in the extravehicular spacesuit and isolated from the severe environment of the space. The inertial sensor I 13.1, the inertial sensor II 13.2, the inertial sensor III 13.3, the inertial sensor IV 13.4, the inertial sensor V 13.5, the inertial sensor VI 13.6, the inertial sensor VII 13.7 and the inertial sensor VIII 13.8 are respectively arranged at the left and right big arms, the left and right forearms, the left and right thighs and the left and right shanks of a human body through bandages. Motion information of the left and right elbow joints and the left and right knee joints of astronauts is obtained by collecting human body limb space state data, so that control signals are generated and input into the controller. The controller controls the switching state of a pneumatic loop of the whole exoskeleton system by controlling the two-position two-way valve 5, and simultaneously controls the states of the first three-position three-way valve 6.1, the second three-position three-way valve 6.2, the third three-position three-way valve 6.3 and the fourth three-position three-way valve 6.4 to control the switching of three states of inflation, maintaining and deflation of the pneumatic loop of the exoskeleton. Moreover, the controller controls the flow and the pressure input into the first negative pressure type flexible actuator 8.1, the second negative pressure type flexible actuator 8.2, the third negative pressure type flexible actuator 8.3 and the fourth negative pressure type flexible actuator 8.4 respectively by controlling the first proportional pressure valve 7.1, the second proportional pressure valve 7.2, the third proportional pressure valve 7.3 and the fourth proportional pressure valve 7.4. Under the action of internal and external pressure difference, assistance is provided for joint motion of astronauts. Meanwhile, the flexible bending sensor 9 integrated at the bottom end of the flexible actuator monitors the working angle state information of the flexible actuator in real time and sends the working angle state information to the controller for feedback control of the exoskeleton system, so that the control precision of the system is improved.

The above content is only used for explaining the technical idea of the present disclosure, the protection range of the present disclosure cannot be limited according to the technical idea, and any modification made on the basis of the technical scheme according to the technical idea provided by the present disclosure falls within the protection range of the claims of the present disclosure.

What is claimed is:

1. A power-assisted negative pressure type flexible exoskeleton system used for an extravehicular spacesuit, comprising an exoskeleton pneumatic control system, a plurality of inertial sensors, a plurality of negative pressure type flexible actuators and a plurality of flexible bending sensors;
   wherein the plurality of inertial sensors are configured for installation on left and right upper arms, left and right forearms, left and right thighs, and left and right shanks of a human body and used for detecting motion signals of elbow joints and knee joints of the human body;
   wherein the plurality of negative pressure type flexible actuators are respectively fixed at two joints of elbows and knees in the extravehicular spacesuit;
   wherein the plurality of flexible bending sensors are respectively fixed at bottoms of the plurality of negative pressure type flexible actuators and used for monitoring bending state signals of the plurality of flexible bending actuators in real time; and
   wherein the exoskeleton pneumatic control system is integrated in a knapsack of the extravehicular spacesuit, and wherein the exoskeleton pneumatic control system comprises:
     a controller respectively connected with the plurality of inertial sensors and the plurality of flexible bending sensors,
     a gas source,
     a water-separating gas filter,
     a pressure reducing valve,
     a pressure gauge,
     a two-position two-way valve,
     a plurality of three-position three-way valves, and
     a plurality of proportional pressure valves;
   wherein the gas source, the water-separating gas filter, the pressure reducing valve, the pressure gauge, and the two-position two-way valve are sequentially connected to form a stable air pressure output source;
   wherein the plurality of three-position three-way valves comprise a first three-position three-way valve connected with a first proportional pressure valve to form a first branch, a second three-position three-way valve connected with a second proportional pressure valve to form a second branch, a third three-position three-way valve connected with a third proportional pressure valve to form a third branch, a fourth position three-way valve connected with a fourth proportional pressure valve to form a fourth branch; the two-position two-way valve is respectively connected with the four branches, the four branches are respectively connected with the plurality of negative pressure type flexible actuators; and wherein the plurality of three-position three-way valves are able to be communicated with a space environment out of the extravehicular spacesuit.

2. The power-assisted negative pressure type flexible exoskeleton system according to claim 1, wherein the negative pressure type flexible actuator is provided with a locking hoop, an end cover, and a pneumatic quick-plug connector, the end cover is connected with the negative pressure type flexible actuator through the locking hoop, and the pneumatic quick-plug connector is arranged on the end cover.

3. The power-assisted negative pressure type flexible exoskeleton system according to claim 2, wherein a vent hole is formed in the left side of the negative pressure type flexible actuator, the vent hole is embedded into the negative pressure type flexible actuator through a hole end cover, and the vent hole and the negative pressure type flexible actuator are connected in a sealed and locked mode through the locking hoop.

4. The power-assisted negative pressure type flexible exoskeleton system according to claim 1, wherein the four branches of the exoskeleton pneumatic control system are respectively connected with a first negative pressure type flexible actuator, a second negative pressure type flexible actuator, a third negative pressure type flexible actuator, and a fourth negative pressure type flexible actuator, which are fixed at the joints of the spacesuit to form four air pressure control loops of the left and right elbow joints and the left and right knee joints of the exoskeleton system.

5. The power-assisted negative pressure type flexible exoskeleton system according to claim 4, wherein the first three-position three-way valve, the second three-position three-way valve, the third three-position three-way valve, and the fourth three-position three-way valve respectively control switching of three states of inflation, maintaining and deflation of the four air pressure control loops;
wherein the first proportional pressure valve, the second proportional pressure valve, the third proportional pressure valve, and the fourth proportional pressure valve respectively control the flow and the pressure input into the first negative pressure type flexible actuator, the second negative pressure type flexible actuator, the third negative pressure type flexible actuator, and the fourth negative pressure type flexible actuator.

6. The power-assisted negative pressure type flexible exoskeleton system according to claim 1, wherein the negative pressure type flexible actuator is made of an elastic rubber material through a mold and is of a corrugated structure in shape.

7. The power-assisted negative pressure type flexible exoskeleton system according to claim 2, wherein the pneumatic quick-plug connector is in threaded connection with the end cover.

8. The power-assisted negative pressure type flexible exoskeleton system according to claim 1, wherein the flexible bending sensor is integrated at the bottom end of the negative pressure type flexible actuator and is bonded through a sealant.

* * * * *